United States Patent
Bretscher et al.

(10) Patent No.: US 10,169,795 B2
(45) Date of Patent: Jan. 1, 2019

(54) SIZING WEARABLE ITEMS BY DEVICE SCANNING

(71) Applicant: Google Technology Holdings LLC, Mountain View, CA (US)

(72) Inventors: John T. Bretscher, Elgin, IL (US); Hisashi D. Watanabe, Lake Forest, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 873 days.

(21) Appl. No.: 14/330,370

(22) Filed: Jul. 14, 2014

(65) Prior Publication Data

US 2015/0161701 A1   Jun. 11, 2015

Related U.S. Application Data

(60) Provisional application No. 61/913,959, filed on Dec. 10, 2013.

(51) Int. Cl.
  *G06Q 30/00* (2012.01)
  *G06Q 30/06* (2012.01)
(52) U.S. Cl.
  CPC .............................. *G06Q 30/0621* (2013.01)
(58) Field of Classification Search
  CPC ............................................... G06Q 30/0621
  USPC ...................................................... 705/26, 27
  See application file for complete search history.

(56) References Cited

U.S. PATENT DOCUMENTS

| | | | |
|---|---|---|---|
| 4,417,401 A | 11/1983 | Aiska et al. | |
| 5,495,568 A * | 2/1996 | Beavin | A61B 5/04021 |
| | | | 345/419 |
| 8,988,503 B2 * | 3/2015 | Pfeiffer | A43D 1/06 |
| | | | 348/46 |
| 9,107,462 B1 * | 8/2015 | Heinrich | A41H 3/007 |
| 2001/0026272 A1 * | 10/2001 | Feld | A41H 3/007 |
| | | | 345/419 |

(Continued)

FOREIGN PATENT DOCUMENTS

WO       2010096878 A1    10/2010

OTHER PUBLICATIONS

Tang, Yuk-Ming et al.; "Human Foot Modeling Towards Footwear Design," CAD Computer Aided Design 43.12; 2011, 8pgs.*

(Continued)

*Primary Examiner* — Robert M Pond
(74) *Attorney, Agent, or Firm* — Lerner, David, Littenberg, Krumholz & Mentlik, LLP (57) ABSTRACT

Disclosed are techniques for sizing wearable items by device scanning. A shopper scans a wearable item with a sensor assembly of a mobile computing device, such as a mobile phone. A wearable-item mapping is generated based on the scan of the wearable item. Similarly, a body part of the shopper is scanned with the sensor assembly to generate a body-part mapping based on the scan of the body part. The wearable-item mapping is then be compared to the body-part mapping, and a fit result determined based on the comparison. The fit result indicates for the shopper whether or not the wearable item is compatible with an associated body part and likely to fit the person. The fit result is presented at the mobile computing device, such as via an audio feedback or a visual feedback.

16 Claims, 5 Drawing Sheets

(56) References Cited

U.S. PATENT DOCUMENTS

| | | | | |
|---|---|---|---|---|
| 2008/0163344 A1* | 7/2008 | Yang | ............ | G06Q 30/0201 |
| | | | | 726/4 |
| 2009/0287452 A1* | 11/2009 | Stanley | ............ | G06Q 30/0601 |
| | | | | 702/155 |
| 2010/0238271 A1* | 9/2010 | Pfeiffer | ............ | A43D 1/06 |
| | | | | 348/46 |
| 2011/0055053 A1* | 3/2011 | Rutschmann | ...... | G06F 17/30259 |
| | | | | 705/27.2 |
| 2014/0120319 A1* | 5/2014 | Joseph | ............ | G01B 11/25 |
| | | | | 428/172 |
| 2014/0225888 A1* | 8/2014 | Bell | ............ | G06T 17/00 |
| | | | | 345/419 |
| 2015/0055085 A1* | 2/2015 | Fonte | ............ | G06Q 30/0621 |
| | | | | 351/178 |

OTHER PUBLICATIONS

Zhong Li et al., "3D Foot and Shoe Matching Based on OBB and AABB," International Journal of Clothing Science and Technology, 2013; ProQuest Dialog #1441361936, 11pgs.*

Yuan-Ping Luh et al., "Augmented Reality-Based Design Customization of Footwear for Children," Journal of Intelligent Manufacturing, 2013; 14pgs.*

Clothes Shopping with Body metrics lets you try it on for Virtual Size, http://mashable.com/2012/01/09/bodymetrics-augmented-reality-shopping/, Apr. 2, 2014, all pages.

* cited by examiner

SIZING WEARABLE ITEMS BY DEVICE SCANNING

CROSS-REFERENCE TO RELATED APPLICATION

The present application claims priority to U.S. Provisional Patent Application 61/913,959 filed on Dec. 10, 2013, the disclosure of which is incorporated herein by reference in its entirety.

TECHNICAL FIELD

The present disclosure is related generally to sizing wearable items and, more particularly, to sizing wearable items, such as clothing, shoes, and accessories by device scanning.

BACKGROUND

Shopping for clothing and other wearable items, such as belts and shoes, can be frustrating for shoppers, particularly when manufacturers seem to apply their own whimsical definition of "standard" sizes. For example, a shopper may be perfectly comfortable in size-8 shoes from one manufacturer but may not even be able to fit into size-8.5 shoes from another. Additionally, even two clothing items from the same manufacturer, and purported to be of the same size, may actually differ in both size and fit. Traditionally, this often means that a judicious shopper should try on shoes and other clothing items for uniqueness of fit before making a purchase.

Conventional techniques that attempt to assist a shopper include placing a clothing item, such as a shirt, on a torso device that approximately replicates the size of the person. A shirt can be test-fitted on the torso device that includes micro switches and contact sensors from which a fitting determination can then be made. However, only some shops will employ such a device, and most shoppers will not want to carry such a cumbersome device around with them. Other techniques include virtual, on-line sizing with a virtual mannequin, which is of no use to a shopper who wants to actually try on a clothing item to check the actual fit and comfort of the item.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

In techniques for sizing wearable items by device scanning, a user having a portable computing device, such as a mobile phone (e.g., a "smart-phone"), can shop for clothing and other wearable items by having mappings of wearable items compared to mappings of corresponding body parts of the user, and the user is provided with a fit result that indicates whether or not a wearable item is likely to fit the person. The present techniques make clothing shopping much less frustrating, at least as far as finding the correct sizes. These techniques also allow accurate sizing for people (e.g., infants) who cannot say whether a particular clothing item fits or not. The techniques are effective for wearable items and corresponding body parts that can be scanned, from which a fit correlation can be determined.

A shopper's body parts and associated wearable items, or portions of each thereof, may include, but are not limited to, a foot and any type of shoe or boot; a head and any type of hat, helmet, or cap; a finger and a ring; a wrist and a watch-band; a hand and an athletic, work, or any other type of glove; a torso and a shirt; a neck and a shirt collar; a breast and a brassiere; a waist and a belt, pants, shorts, or any other type of wearable item that is designed to be worn around a person's waist; an arm or leg and a shirt sleeve or pant leg (e.g., for length fit); and any other body parts and associated wearable items.

A shopper can scan any of the wearable items with a sensor assembly of a mobile computing device, such as a mobile phone, and a wearable-item mapping is generated based on the scan of a wearable item. Similarly, a body part of the shopper can be scanned with the sensor assembly of the mobile phone, and a body-part mapping is generated based on the scan of the body part. The wearable-item mapping can then be compared to the body-part mapping, and a fit result determined based on the comparison. The fit result indicates for the shopper whether or not the wearable item is compatible with an associated body part and likely to fit the person, and the fit result can be presented at the mobile computing device, such as by an audio feedback or a visual feedback.

While features and concepts of sizing wearable items by device scanning can be implemented in any number of different devices, systems, environments, and configurations, the techniques for sizing wearable items by device scanning are described in the context of the following example devices, systems, environments, and methods.

Figure 1:
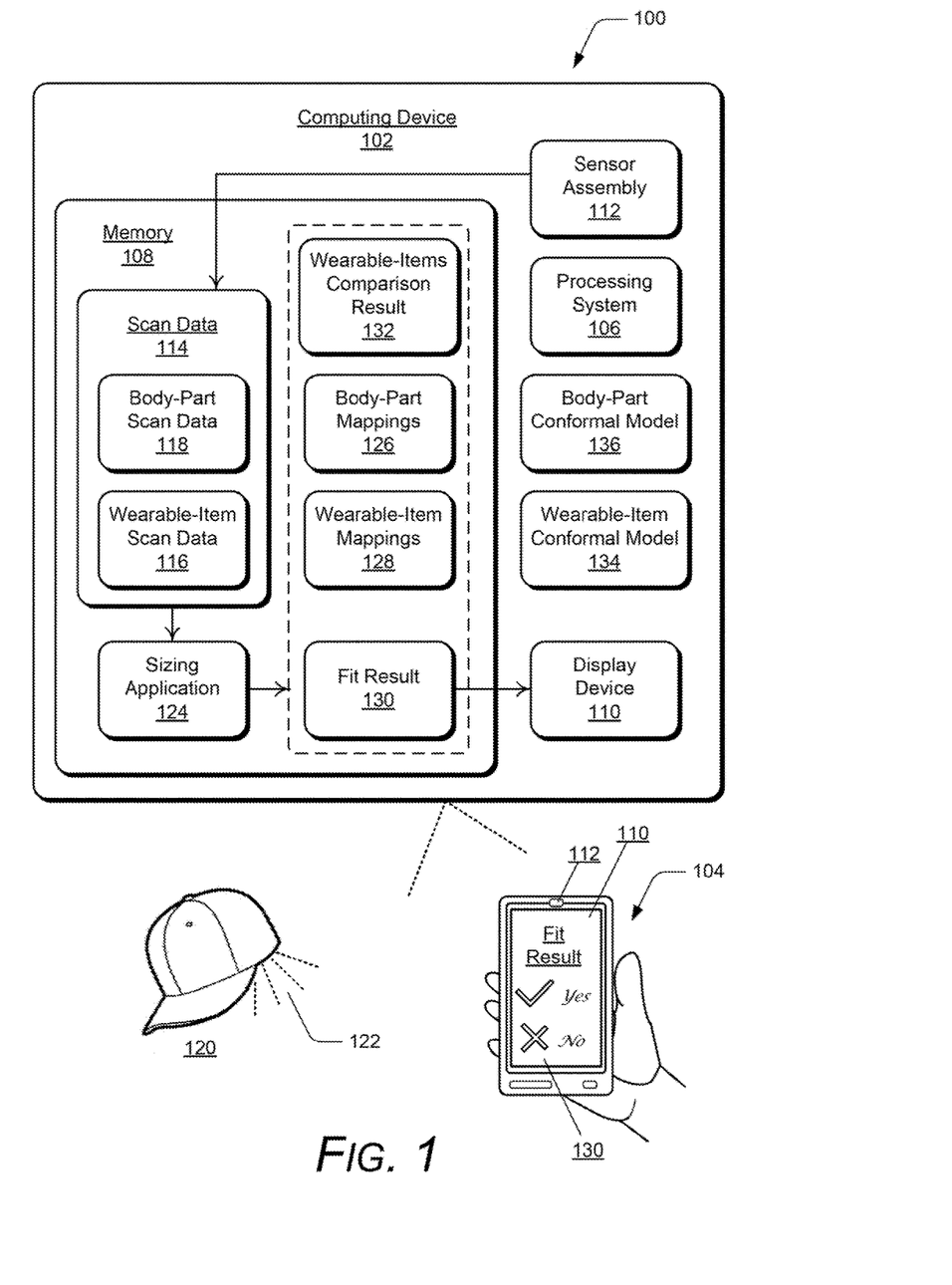
FIG. 1 illustrates a representative environment in which the present techniques for sizing wearable items by device scanning may be practiced.

FIG. 1 illustrates an example environment 100 in which techniques for sizing wearable items by device scanning can be implemented. The environment includes a computing device 102, which may be any type of portable electronic or computing device, such as a mobile phone 104 or similar portable communication or computing device. The computing device 102 can be implemented with various components, such as a processing system 106 and memory 108, as well as any number and combination of differing components as further described with reference to the example device shown in FIG. 5. In this example, the computing device 102 includes an integrated display device 110 and a sensor assembly 112 that can be implemented to scan wearable items, as well as body parts of a user of the computing device. A comparison of a wearable item to a body part can be initiated to determine whether or not the wearable item is likely to fit the person.

The sensor assembly 112 may include any type of camera, infra-red, array imagers, or other types of imaging devices that can be implemented to scan an item or capture an image, from which the scan data 114 can be generated. The sensor assembly can be implemented as any type of device-integrated assembly, or as a portable, connectable sensor assembly that can scan an interior or void space of a wearable item and produce the scan data from which details and contours of the wearable item can then be mapped. Similar portable sensor assemblies are deployed to map building interiors, and these sensors, along with sophisticated software, are often implemented in portable electronic devices, such as laptop computers. When placed in a building room, a sensor assembly scans the surroundings and produces a detailed, accurate mapping of the room with sub-millimeter accuracy. Similarly, the sensor assembly 112 implemented with the computing device 102 can be placed in a wearable item, such as inside a hat, a shoe or boot, or inside of a shirt, and accurately scan the item. An accurate mapping of the wearable item can then be generated based on the scan data, providing very accurate sizing information.

The mobile phone 104 illustrates an example of the display device 110 and the sensor assembly 112, such as a camera device or an infra-red sensor of the mobile phone. The sensor assembly 112 is implemented to scan or image a wearable item, or a portion of the wearable item, thus generating wearable-item scan data 116. Similarly, the sensor assembly can be used to scan a person's body part, or a portion of the body part, which generates body-part scan data 118. For example, a user of the mobile phone 104 may use the device to determine whether a hat 120 (e.g., a wearable item) is likely to fit and can do so without having to try the hat on.

Using the sensor assembly 112 of the mobile phone 104, the user can scan his head to establish a mapping of the body part for size comparisons. A user can scan a body part, or a portion thereof, while out shopping in a store, or may scan the body part prior to going out and save the mapping of the body part on the device for later reference and size comparisons. The user can then scan the hat 120 while shopping to establish a mapping of the wearable item, which can then be compared to the mapping of the body part to determine if the hat will likely fit the person's head. The user can utilize the sensor assembly 112 of the mobile phone 104 to scan the interior of the wearable item at 122 to determine the circumference of the hat band, as well as the size of the void space in the interior of the hat. Although this example is overly-simplified, and the person would likely just try on the one hat to determine the level of fit and comfort, when faced with a wall of rows of hats, the described technique to simply scan the hats that are of interest to the person would be much faster and far less tedious than trying on each and every hat to find one that fits to the satisfaction of the person. Further, as noted above, even in a group of the same-sized set of hats from the same manufacturer, more than one of the hats will likely be slightly different in size, fit, and overall construction.

The example computing device 102 includes a sizing application 124 that can be implemented as a software application or module, such as executable software instructions (e.g., computer-executable instructions) that are executable by the processing system 106 of the computing device and stored on the computer-readable storage memory 108, such as any suitable memory device or electronic data storage. In embodiments, the sizing application 124 implements techniques to size and compare portions of a person's body parts that correlate to wearable items the person may be looking to purchase, or try on.

The sizing application 124 is implemented to receive the scan data 114 that are generated by the sensor assembly 112 and to generate body-part mappings and wearable-item mappings for comparison. The sizing application 124 generates the body-part mappings 126 based on the body-part scan data 118 that are associated with respective body-part scans. For example, the body-part scan data 118 may be the scan data of the user's head for size comparison when shopping for hats, and the sizing application generates a body-part mapping 126 of the user's head based on the body-part scan data. Alternatively or in addition, a body-part mapping may be received as a user-configurable input, or as an adjustment to a body-part mapping that has been generated by the sizing application. Similarly, the sizing application 124 generates the wearable-item mappings 128 based on the wearable-item scan data 116 that are associated with respective wearable-item scans. For example, the wearable-item scan data 116 may be the scan data of the interior portion of the hat 120, and the sizing application generates a wearable-item mapping 128 of the hat based on the wearable-item scan data. The body part and wearable-item mappings include the sizing information for comparison of the body part and respective wearable item. Alternatively, the sizing application 124 can simply generate the sizing information for the wearable item and the corresponding body part without having to create the complete body-part mapping and wearable-item mapping.

The sizing application 124 is also implemented to compare a wearable-item mapping 128 to a body-part mapping 126 and to determine a fit result 130 that is an indication of whether or not a wearable item is compatible with an associated body part. For example, the sizing application 124 can compare the wearable-item mapping 128 of the hat 120 (e.g., the interior hat band and void space, in this instance) to the body-part mapping 126 of the person's head. The sizing application 124 can then determine the fit result 130 that indicates whether or not the hat 120 will likely fit the person. The mobile phone 104 illustrates an example of the fit result 130 displayed for viewing, where the user of the device may view any type of graphic or text-based fit-result indication. Alternatively or in addition, the fit result 130 may be presented to the user of the device as any type of audible feedback to indicate whether or not a wearable item is compatible with an associated body part. Although the fit result 130 is illustrated as a "Yes," "No" condition in this example (i.e., as text and a graphic indication), the fit result may be displayed in any other form to indicate a more-likely fit or a less-likely fit. For example, a percentage of likely fit versus a percentage of not-likely fit of a wearable item may be displayed, such as in text form or as a graphic chart.

The techniques described herein are not limited to determining the fit result 130 for only one wearable item. As alluded to above in the hat example, the user of the mobile phone 104 may scan many hats that are of interest when shopping for a hat. The sizing application 124 can then generate a wearable-item mapping 128 for each individual hat and compare the wearable-item mappings to generate a wearable-items comparison result 132. The sizing application can then determine which of the hats is likely to fit the user the best from the wearable-items comparison result. Further, if a fit result 130 indicates that a wearable item is not compatible with a body part, the sizing application 124 can recommend a different wearable item that likely will be compatible with the associated body part. For example, if the fit result 130 for one of the hats indicates that the hat is not compatible with the user's head, the sizing application can recommend a different one of the hats that likely will fit the user.

In implementations, the sizing application 124 may apply a conformal model of a wearable item or a conformal model of a body part when making comparisons of the wearable-item mappings 128 to the body-part mappings 126. A conformal model of a wearable item or body part can account for deformation, elasticity properties, and a degree or range of conformance that a wearable item or body part is capable of adapting to fit a wearable item with a body part. A conformal model can be applied for a body part and another applied for any type of wearable item that may be flexible, adaptable, stretchable, conforming, and the like. For example, ballet flats are relatively stretchy while alpine boots, even traditional leather ones, are anything but. In another example, the conformal model of a typical metal ring would indicate that the ring has absolutely no conforming properties or give at all. A conformal model of a finger, on the other hand, could account for the relatively non-deformable joints and for the deformable flesh surrounding the joints. These conformal models can be applied when the sizing application 124 compares sizing information for a wearable item and a corresponding body part and can lead to more accurate sizing matches.

Continuing the example of the hat 120, a wearable-item conformal model 134 for the hat can indicate how flexible or rigid the interior hat band is and whether a determined fit of the hat has any leeway or flexibility. Some hats are designed to fit specifically, while others may have a flexible fitting band that is designed to accommodate different-sized people, such as a "one-size-fits-all" design. In a similar example, a knit cap stretches and is indeed meant to be stretched when worn. Thus, a simple comparison of a person's head size to the scanned size of a knit cap taken from a shelf (e.g., an unstretched knit cap) would be meaningless to the shopper. The sizing application 124 can then apply the wearable-item conformal model 134 for the hat 120 when comparing the wearable-item mapping 128 to the body-part mapping 126 to make a determination as to whether the hat will fit the person.

Similarly, a body-part conformal model 136 for the user's head can take into account whether the person shopping for the hat has little or no hair, or alternatively, an abundance of hair that will compress when a hat is worn, effectively reducing the overall size of the circumference around the person's head and altering the expected fit of the hat. Accordingly, the sizing application 124 can be implemented to determine the fit result 130 based on a comparison of a wearable-item mapping 128 to a body-part mapping 126, as well as taking into account a wearable-item conformal model 134 applied to the comparison and a body-part conformal model 136 applied to the comparison.

A wearable-item conformal model 134 for a particular wearable item can be requested and received from a manufacturer or a distributor of the wearable item and may be further user-configurable. A body-part conformal model 136 may be implemented as a user-configurable input that the user can enter via a user interface of the sizing application that is displayed on the display device 110 of the computing device 102.

Figure 2:
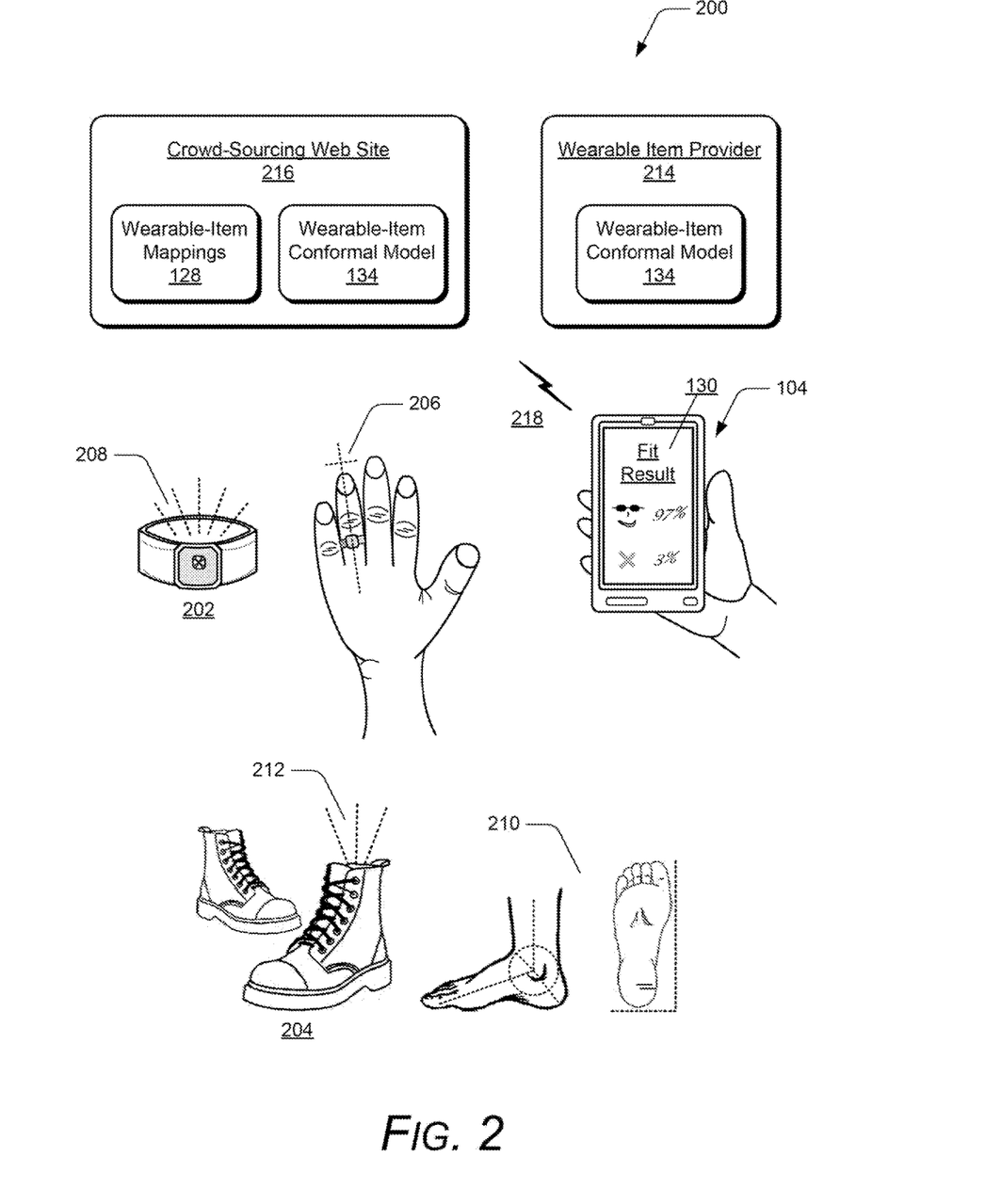
FIG. 2 illustrates examples of sizing wearable items by device scanning in accordance with the present techniques.

FIG. 2 illustrates examples 200 of sizing wearable items by device scanning in accordance with the techniques described herein. The mobile phone 104, which is an example of the computing device 102 described with reference to FIG. 1, can be positioned to scan many different types of wearable items and body parts with the sensor assembly 112. In the illustrated examples 200, a user of the mobile phone 104 may use the device to determine whether a ring 202 and a pair of boots 204 (e.g., wearable items) are likely to fit. Using the sensor assembly 112 of the mobile phone 104, the user can scan the exterior circumference of his ring finger 206 to establish a body-part mapping 126 of the finger and can scan the ring 202 (e.g., the interior circumference scanned at 208) to establish a wearable-item mapping 128 of the ring. As an alternative to scanning the interior circumference of the ring 202, the sensor assembly 112 may be used to scan the exterior circumference to determine the sizing information of the ring. Similarly, the exterior of wearable items can be scanned for those items that do not have an interior or void space, such as a belt, to determine the sizing information for the wearable item.

The sizing application 124 generates the body-part mapping 126 based on the body-part scan data 118 of the user's ring finger 206. The sizing application 124 generates the wearable-item mapping 128 based on the wearable-item scan data 116 of the ring 202. The sizing application 124 can then compare the wearable-item mapping 128 for the ring to the body-part mapping 126 for the finger and determine a fit result 130 that is an indication of whether or not the ring 202 is compatible and likely to fit the user's ring finger 206. The mobile phone 104 illustrates an example of the fit result 130 displayed for viewing, such as a graphic indication along with a percentage of likely fit versus a percentage of not-likely fit of the wearable item.

Similarly, the user of the mobile phone 104 can utilize the sensor assembly 112 to scan the various dimensions and contours of his foot 210 to establish a body-part mapping 126 of the foot and can scan the boot 204 (e.g., the interior scanned at 212) to establish a wearable-item mapping 128 of the boot. In implementations, the mobile phone 104 may include a void-conformable inflatable apparatus or attachment, such as a balloon or other inflatable or fillable mechanism. The void-conformable inflatable can be placed in the boot, for example, and inflated to map the interior contours and size of the boot. The void-conformable inflatable may be implemented with an internal sensor that communicates the boot-interior size, contours, and configuration as the wearable-item scan data 116 to the sizing application 124 of the mobile phone 104.

The sizing application 124 also generates the body-part mapping 126 based on the body-part scan data 118 of the user's foot 210. The sizing application 124 generates the wearable-item mapping 128 based on the wearable-item scan data 116 of the boot 204. The sizing application 124 can then compare the wearable-item mapping 128 for the boot to the body-part mapping 126 for the foot and determine a fit result 130 that is an indication of whether or not the boot 204 is compatible and likely to fit the user's foot 210. Unlike the ring and user's finger, which are generally inflexible and not likely to deviate in size, the boot 204 may have some sizing flexibility due to its design and type of material, particularly in the upper portion of the boot that would encircle the person's lower leg above the ankle. In this instance, the sizing application 124 can apply a wearable-item conformal model 134 of the boot to make a determination as to whether the boot will fit the person, where the conformal model indicates a degree or range of conformance that the boot is capable of adapting to fit the person's foot and lower-leg portion.

As noted above, a wearable-item conformal model 134 for a particular wearable item can be requested and received from a wearable-item provider 214, such as a manufacturer or a distributor of the wearable item. In other implementations, the sizing application 124 that is implemented by the mobile phone 104 can communicate with a crowd-sourcing Web site 216 via a network 218. Generally, a crowd-sourcing Web site is where many different users of an on-line community can obtain resources and content as well as anonymously upload and share content with the many other users.

In this example, the crowd-sourcing Web site 216 may maintain instances of a wearable-item conformal model 134. The sizing application 124 can request and receive a wearable-item conformal model for a particular wearable item from the crowd-sourcing Web site. Additionally, the mobile phone 104 can communicate to upload instances of the wearable-item mappings 128 to the crowd-sourcing Web site, from which the wearable-item mappings are accessible to multiple, other computing-device users. For example, rather than the user of the mobile phone 104 (e.g., as a current shopper) having to scan the ring 202 while shopping for rings, a wearable-item mapping of the ring may have already been generated and uploaded, and is available for download from the crowd-sourcing Web site 216 for comparison with the body-part mapping of the user's ring finger.

In a shoe-shopping example, each individual shopper would likely want to scan his own feet, but it need not be the case that this same shopper needs to scan all potentially relevant shoes the shopper may be interested in. Rather, when other shoppers scan shoes, they can upload the scan data or the generated wearable-item mappings to the crowd-sourcing Web site 216. A shopper may also upload comments along with the scan data and the wearable-item mapping for an item, such as to indicate that the stated size of a pair of shoes runs larger or smaller than one would expect. This scanning data, mapping information, and associated comments can then be used and reviewed by subsequent shoppers. Because the uploaded information is based on actual scans of the physical items, this should be more accurate than the already known posts such as "this shoe runs slightly larger than size." Thus, the present techniques can also be used by shoppers to increase their success rate when shopping online for clothing, shoes, and other wearable items. A shopper may also search the crowd-sourcing Web site 216 for locations of wearable items that are likely to fit prior to setting out on a shopping trip, thus saving time by knowing ahead of time which store or stores have a sought-after wearable item that will likely fit the shopper.

Any of the devices and Web site servers can communicate via the network 218, which can be implemented to include a wired or a wireless network. The network can also be implemented using any type of network topology and communication protocol, and can be represented or otherwise implemented as a combination of two or more networks, to include IP-based networks and the Internet. The network may also include mobile-operator networks that are managed by a mobile-network operator or other network operators, such as a communication-service provider, cell-phone provider, and Internet-service provider.

Example methods 300 and 400 are described with reference to respective FIGS. 3 and 4 in accordance with implementations of sizing wearable items by device scanning Generally, any of the services, components, modules, methods, and operations described herein can be implemented using software, firmware, hardware (e.g., fixed-logic circuitry), manual processing, or any combination thereof. The example methods may be described in the general context of executable instructions stored on computer-readable storage media that are local or remote to a computer-processing system, and implementations can include software applications, programs, functions, and the like.

Figure 3:
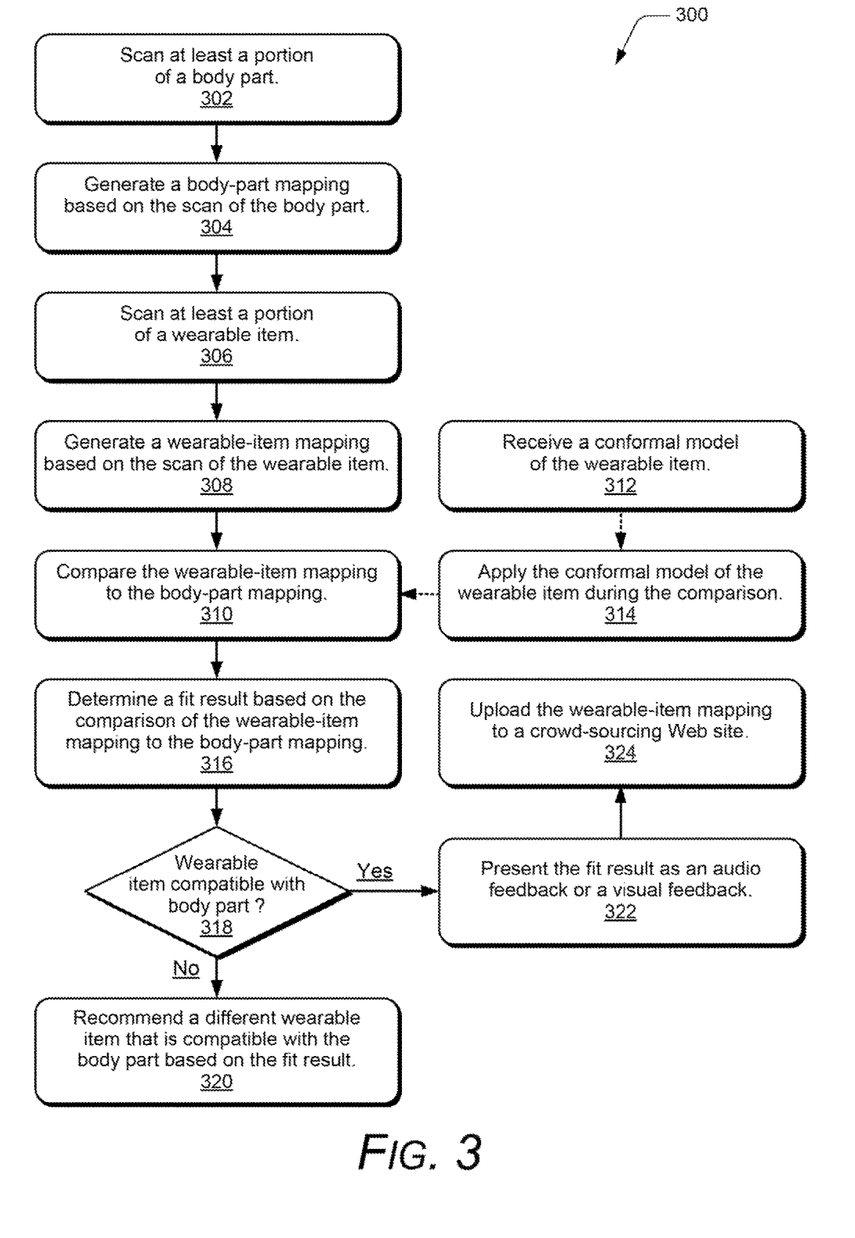
FIG. 3 illustrates an example method of sizing wearable items by device scanning in accordance with the present techniques.

FIG. 3 illustrates an example method 300 of sizing wearable items by device scanning. The order in which the method is described is not intended to be construed as a limitation, and any number or combination of the described method operations can be performed in any order to perform a method or an alternate method.

At 302, at least a portion of a body part is scanned. For example, the sensor assembly 112 that is implemented by the computing device 102 (FIG. 1) scans a portion of a body part, such as when a user of the mobile phone 104 (i.e., an example of the computing device 102) uses the device to scan his head before or during shopping for the hat 120. Similarly, the user of the mobile phone 104 can initiate the sensor assembly 112 scanning his ring finger 206 (FIG. 2) when shopping for the ring 202 and scanning his foot 210 when shopping for the pair of boots 204.

At 304, a body-part mapping is generated based on the scan of the body part. For example, the sizing application 124 that is implemented by the computing device 102 generates the body-part mapping 126 for each body part that is scanned by the sensor assembly 112. The sizing application 124 receives the scan data 114 that are generated by the sensor assembly 112 and generates the body-part mappings 126 based on the body-part scan data 118 that are associated with the respective body-part scans.

At 306, at least a portion of a wearable item is scanned. For example, the sensor assembly 112 that is implemented by the computing device 102 scans a portion of a wearable item, such as when a user of the mobile phone 104 uses the device to scan the interior of the hat 120 to determine the circumference of the hat band as well as the size of the void space in the interior of the hat. Similarly, the user of the mobile phone 104 can initiate the sensor assembly 112 scanning the ring 202 (e.g., the interior circumference scanned at 208) and scanning the interior of the boot 204 (e.g., scanned at 212).

At 308, a wearable-item mapping is generated based on the scan of the wearable item. For example, the sizing application 124 generates the wearable-item mapping 128 for each wearable item that is scanned by the sensor assembly 112. The sizing application 124 receives the scan data 114 that are generated by the sensor assembly 112 and generates the wearable-item mappings 128 based on the wearable-item scan data 116 that are associated with the respective wearable-item scans.

At 310, the wearable-item mapping is compared to the body-part mapping. For example, the sizing application 124 compares a wearable-item mapping 128 to a body-part mapping 126, such as when comparing the wearable-item mapping 128 of the hat 120 to the body-part mapping 126 of the person's head. Similarly, the sizing application 124 compares the wearable-item mapping 128 for the ring 202 to the body-part mapping 126 for the user's ring finger 206, and compares the wearable-item mapping 128 for the boot 204 to the body-part mapping 126 for the user's foot 210.

At 312, in optional implementations, a conformal model of the wearable item is received, and, at 314, the conformal model of the wearable item is applied during the comparison of the wearable-item mapping to the body-part mapping. For example, the wearable-item conformal model 134 is received from the wearable-item provider 214, such as a manufacturer or a distributor of the wearable item, and the sizing application 124 applies the wearable-item conformal model 134 when comparing a wearable-item mapping 128 to a body-part mapping 126 (at 310). Although not shown, the sizing application 124 may also apply a body-part conformal model 136 when comparing a wearable-item mapping 128 to a body-part mapping 126 (at 310).

At 316, a fit result is determined based on the comparison of the wearable-item mapping to the body-part mapping. For example, the sizing application 124 determines the fit result 130 based on the comparison of the wearable-item mapping 128 to the body-part mapping 126 (at 310), and the fit result indicates whether or not the wearable item is compatible with the body part. Further, the fit result 130 can be based, at least in part, on the wearable-item conformal model 134 or the body-part conformal model 136 as applied to the wearable-item mapping compared to the body-part mapping. In the examples described herein, the sizing application 124 determines the fit result 130 that indicates whether or not the hat 120 will likely fit the person (e.g., the user of the mobile phone 104). The sizing application 124 also determines the fit result 130 that indicates whether or not the boot 204 is compatible and likely to fit the user's foot 210, and determines the fit result 130 that indicates whether or not the ring 202 is compatible and likely to fit the user's ring finger 206.

At 318, a determination is made as to whether the wearable item is compatible with the body part. For example, as described above at 316, the sizing application 124 determines whether a wearable item is compatible and likely to fit a body part based on the fit result 130. If a wearable item is not compatible with the body part (i.e., "No" from 318), then at 320, a different wearable item that is compatible with the body part is recommended. For example, the sizing application 124 recommends a different wearable item that likely will be compatible with the body part, such as if the fit result 130 for one of the hats indicates that the hat is not compatible with the user's head, the sizing application recommends a different one of the hats that likely will fit the user.

If the wearable item is compatible with the body part (i.e., "Yes" from 318), then at 322, the fit result is presented as an audio feedback or as a visual feedback. For example, the fit result 130 is displayed on the display device 110 of the mobile phone 104, such as by any type of graphic or text-based fit-result indication. The fit result 130 is illustrated in FIG. 1 on the display device 110 of the mobile phone 104 as a "Yes", "No" condition with both text and a graphic indication. The fit result 130 is illustrated differently in FIG. 2 on the display device 110 of the mobile phone 104 as a graphic indication along with a percentage of likely fit versus a percentage of not-likely fit of a wearable item. Alternatively or in addition, the fit result 130 is presented to the user of the device as any type of audible feedback to indicate whether or not a wearable item is compatible with a body part.

At 324, the wearable-item mapping of the wearable item is uploaded to a crowd-sourcing Web site. For example, the sizing application 124 can initiate the computing device 102 uploading a wearable-item mapping 128 to the crowd-sourcing Web site 216 from which the wearable-item mapping is accessible to other computing-device users.

Figure 4:
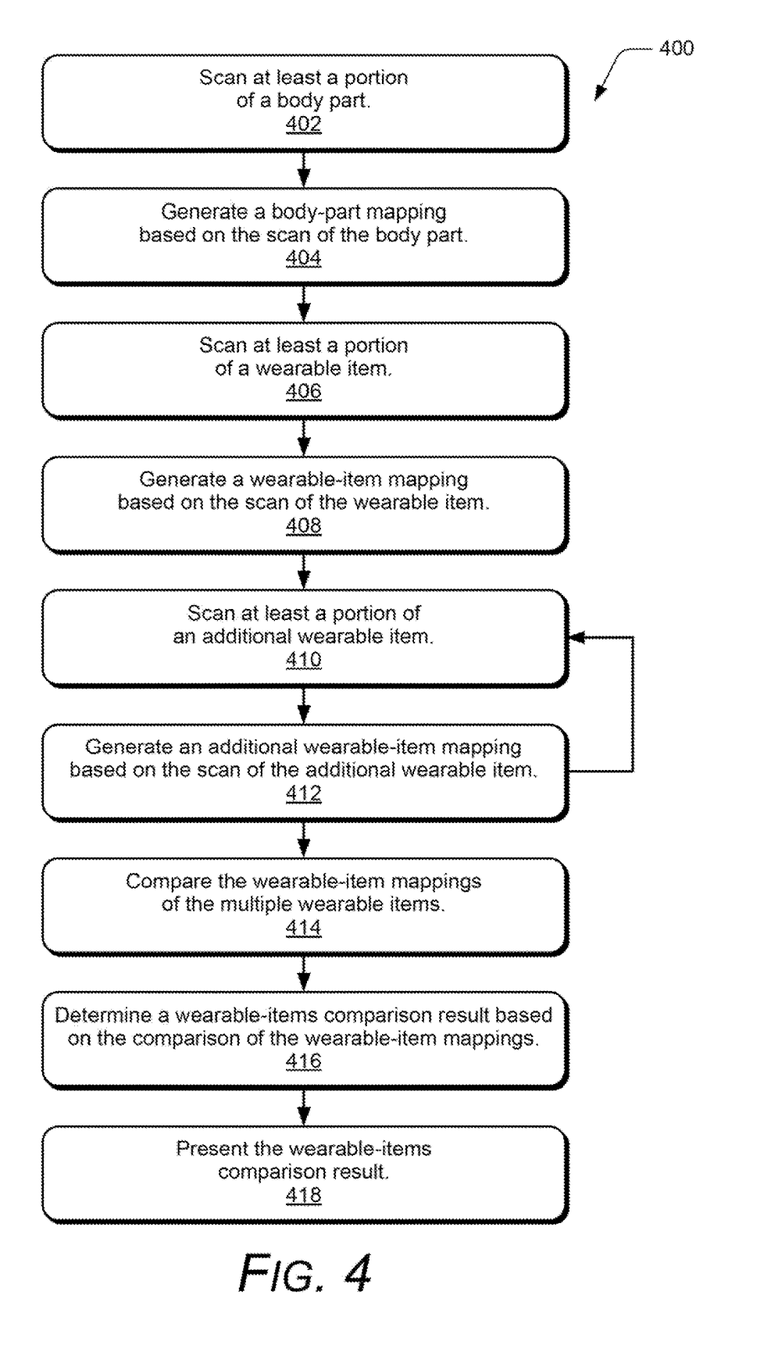
FIG. 4 illustrates another example method of sizing wearable items by device scanning in accordance with the present techniques.

FIG. 4 illustrates an example method 400 of sizing wearable items by device scanning. The order in which the method is described is not intended to be construed as a limitation, and any number or combination of the described method operations can be performed in any order to perform a method, or an alternate method.

At 402, at least a portion of a body part is scanned. For example, the sensor assembly 112 implemented by the computing device 102 (FIG. 1) scans a portion of a body part, such as when a user of the mobile phone 104 (e.g., an example of the computing device 102) uses the device to scan his head before or during shopping for the hat 120. At 404, a body-part mapping is generated based on the scan of the body part. For example, the sizing application 124 receives the scan data 114 that are generated by the sensor assembly 112 and generates the body-part mapping 126 based on the body-part scan data 118 that are associated with the respective body part scan of the person's head.

At 406, at least a portion of a wearable item is scanned. For example, the sensor assembly 112 of the computing device 102 scans a portion of a wearable item, such as when a user of the mobile phone 104 uses the device to scan the interior of the hat 120 to determine the circumference of the hat band, as well as the size of the void space in the interior of the hat. At 408, a wearable-item mapping is generated based on the scan of the wearable item. For example, the sizing application 124 receives the scan data 114 that are generated by the sensor assembly 112 and generates the wearable-item mapping 128 based on the wearable-item scan data 116 that are associated with the hat 120.

At 410, at least a portion of an additional wearable item is scanned. For example, the user of the mobile phone 104 uses the sensor assembly 112 of the device to scan the interior circumference of the hat band and the void space of many hats that are of interest to the user while shopping for a hat. Rather than having to try on multiple hats or shoes to find ones that fit to the satisfaction of the person, the shopper can scan all of the hats and the shoes and then try on only those wearable items that are determined as most likely to fit.

At 412, an additional wearable-item mapping is generated based on the scan of the wearable item. For example, the sizing application 124 receives the scan data 114 for each individual hat that are generated by the sensor assembly 112, and the sizing application generates the wearable-item mappings 128 based on the wearable-item scan data 116 that are associated with each of the individual hats. The method can be repeated at 410 to scan additional wearable items (e.g., the multitude of hats that the user of the device is scanning), and then at 412 to generate the wearable-item mappings 128 for each of the wearable items.

At 414, the wearable-item mappings of the multiple wearable items are compared. For example, the sizing application compares the wearable-item mappings 128 that correspond to each of the hats the user of the mobile phone 104 is scanning to determine which of the hats is likely to fit the user the best. At 416, a wearable-items comparison result is determined based on the comparison of the wearable-item mappings. For example, the sizing application 124 determines the wearable-items comparison result 132 based on the comparison (at 414) of the multiple wearable-item mappings 128.

At 418, the wearable-items comparison result is presented. For example, the sizing application 124 presents the wearable-items comparison result 132 as an audio feedback or as a visual feedback, such as on the display device 110 of the mobile phone 104 or as an audio output. The method 400 may then continue at 318 (FIG. 3) to determine whether the selected wearable item of the wearable-items comparison result is compatible with the body part, such as whether the selected hat is compatible and fits the user's head.

Figure 5:
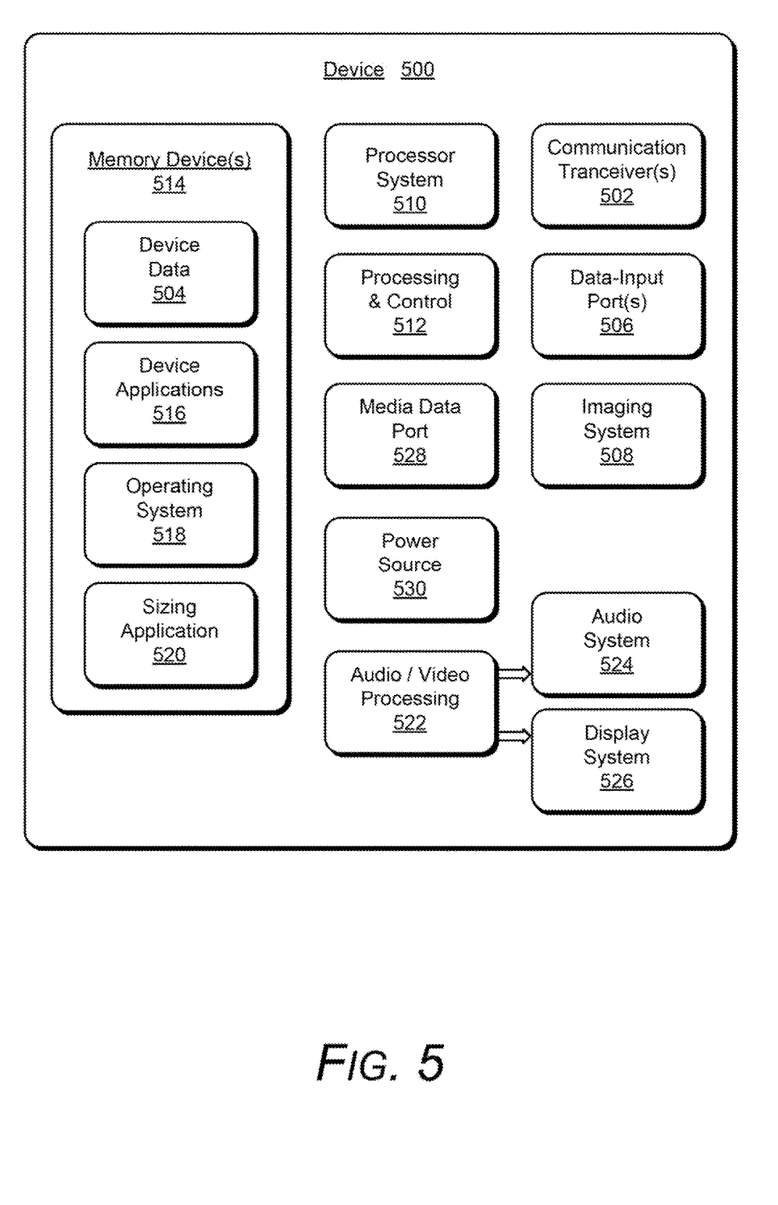
FIG. 5 illustrates various components of an example device that can implement the present techniques for sizing wearable items by device scanning.

FIG. 5 illustrates various components of an example device 500 that can be implemented as any portable or mobile computing device described with reference to any of the previous FIGS. 1 through 4. In embodiments, the example device 500 may be implemented as any one or combination of a communication, computer, playback, gaming, entertainment, mobile phone, tablet computing device, and wearable device.

The device 500 includes communication transceivers 502 that enable wired or wireless communication of device data 504, such as the scan data 114, the body-part mappings 126, the wearable-item mappings 128, the fit result 130, and the wearable-items comparison result 132. Example transceivers include wireless personal area network radios compliant with various Institute of Electrical and Electronics Engineers ("IEEE") 802.15 standards, wireless local area network radios compliant with any of the various IEEE 802.11 standards, wireless wide area network radios for cellular telephony, wireless metropolitan area network radios compliant with various IEEE 802.15 standards, and wired local area network Ethernet transceivers.

The device 500 may also include one or more data-input ports 506 via which any type of data, media content, and inputs can be received, such as user-selectable inputs, messages, music, television content, recorded content, and any other type of audio, video, an image data received from any content or data source. The data-input ports may include universal serial bus ports, coaxial-cable ports, and other serial or parallel connectors (including internal connectors) for flash memory, digital versatile disks ("DVDs"), CDs, and the like. These data-input ports may be used to couple the device to components, peripherals, or accessories such as microphones and cameras. The video or image data may also be received via an integrated imaging system 508, such as a camera sensor assembly.

The device 500 includes a processor system 510 of one or more processors (e.g., any of microprocessors, controllers, and the like), or a processor and memory system (e.g., implemented in a system on a chip) that processes computer-executable instructions. The processor system may be implemented at least partially in hardware, which can include components of an integrated circuit or on-chip system, an application-specific integrated circuit, a field-programmable gate array, a complex programmable logic device, and other implementations in silicon or other hardware. Alternatively or in addition, the device can be implemented with any one or combination of software, hardware, firmware, or fixed-logic circuitry that is implemented in connection with processing and control circuits, which are generally identified at 512. Although not shown, the device can include a system bus or data-transfer system that couples the various components within the device. A system bus can include any one or combination of different bus structures, such as a memory bus or memory controller, a peripheral bus, a universal serial bus, a processor bus, or a local bus that utilizes any of a variety of bus architectures.

The device 500 also includes one or more memory devices 514 that enable data storage, examples of which include random-access memory, non-volatile memory, and a disk storage device. A disk storage device may be implemented as any type of magnetic or optical storage device, such as a hard disk drive, a recordable or rewriteable disc, any type of a DVD, and the like. The device 500 may also include a mass-storage media device.

A memory device 514 provides data-storage mechanisms to store the device data 504, other types of information and data, as well as various device applications 516 (e.g., software applications). For example, an operating system 518 can be maintained as software instructions with a memory device and executed by the processor system 510. The device applications may also include a device manager, such as any form of a control application, software application, signal-processing and control module, code that is native to a particular device, a hardware abstraction layer for a particular device, and so on. The device may also include a sizing application 520 that implements the techniques and embodiments of sizing wearable items by device scanning as described herein, such as when the device 500 is implemented as the computing device 102 described with reference to FIGS. 1 through 4. The sizing application 520 is an example of the sizing application 124 described with reference to FIGS. 1 through 4.

The device 500 also includes an audio and video processing system 522 that generates audio data for an audio system 524 and generates display data for a display system 526. The audio system and the display system may include any devices that process, display, or otherwise render audio, video, display, and image data. Display data and audio signals can be communicated to an audio component or to a display component via an RF ("radio-frequency") link, S-video link, high-definition multimedia interface, composite video link, component video link, digital video interface, analog audio connection, or other similar communication link, such as media data port 528. In implementations, the audio system and the display system are integrated components of the example device.

The device 500 can also include a power source 530, such as when the device is implemented as a portable computing device, mobile phone, or other type of portable electronic device. The power source may include a charging or power system, and can be implemented as a flexible strip battery, a rechargeable battery, an RF signal received from an associated device and stored for near-field communication, a charged super-capacitor, or any other type of active or passive power source.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
    scanning at least a portion of a wearable item with a mobile computing device to generate a wearable-item mapping;
    determining a fit result based on comparing the wearable-item mapping to the body-part mapping while applying a conformal model of the body part, the conformal model accounting for deformability or elasticity of the body part during determination of the fit result; and
    presenting the fit result at the mobile computing device.

2. The method of claim 1 further comprising:
    scanning at least the portion of the body part with the mobile computing device to generate the body-part mapping.

3. The method of claim 1 wherein said scanning at least the portion of the wearable item comprises scanning an interior of the wearable item.

4. The method of claim 1 wherein the fit result comprises an indication of whether or not the wearable item is compatible with the body part.

5. The method of claim 4 further comprising:
recommending a different wearable item that is compatible with the body part based on the fit result indicating that the wearable item is not compatible with the body part.

6. The method of claim 1 further comprising:
receiving the conformal model of the wearable item from one of a manufacturer or a distributor of the wearable item.

7. The method of claim 1 further comprising:
uploading the wearable-item mapping of the wearable item to a crowd-sourcing Web site from which the wearable-item mapping is accessible to multiple computing-device users.

8. The method of claim 1 further comprising:
scanning at least a portion of an additional wearable item with the mobile computing device to generate an additional wearable-item mapping; and
presenting, to the user of the mobile computing device, a wearable-items comparison result based on comparing the wearable-item mappings of the wearable item and the additional wearable item.

9. A mobile computing device comprising:
a sensor assembly configured to scan a wearable item;
a display device configured to present a fit result that indicates whether or not the wearable item is compatible with a body part; and
a memory and processor system to implement a sizing application that is configured to:
generate a wearable-item mapping based, at least in part, on the scan of the wearable item;
determine the fit result based on a comparison of the wearable-item mapping to the body-part mapping, the comparison comprising application of a conformal model of the body part, wherein the conformal model accounts for deformability or elasticity of the body part during determination of the fit result; and
initiate the fit result presented for viewing.

10. The mobile computing device of claim 8 wherein:
the sensor assembly is configured to scan an interior of the wearable item and scan the body part; and
the sizing application is configured to generate the body-part mapping based, at least in part, on the scan of the body part.

11. The mobile computing device of claim 8 wherein the sizing application is configured to recommend a different wearable item that is compatible with the body part based on the fit result indicating that the wearable item is not compatible with the body part.

12. The mobile computing device of claim 8 wherein the sizing application is configured to receive the conformal model of the wearable item from one of a manufacturer or a distributor of the wearable item.

13. The mobile computing device of claim 8 wherein:
the sensor assembly is configured to scan an additional wearable item; and
the sizing application is configured to:
generate an additional wearable-item mapping based, at least in part, on the scan of the additional wearable item;
determine a wearable-items' comparison result based on the comparison of wearable-item mappings of the wearable item and the additional wearable item; and
initiate the wearable-items' comparison result presented for viewing.

14. A method comprising:
scanning at least a portion of a wearable item with a mobile computing device to generate a wearable-item mapping;
determining a fit result based on comparing the wearable-item mapping to a body-part mapping, the fit result based, at least in part, on a conformal model of the body part, the conformal model accounting for deformability or elasticity of the body part during determination of the fit result; and
presenting the fit result at the mobile computing device as one of an audio feedback or a visual feedback.

15. The method of claim 14 wherein the fit result comprises an indication of whether or not the wearable item is compatible with the body part.

16. The method of claim 15 further comprising:
recommending a different wearable item that is compatible with the body part based on the fit result indicating that the wearable item is not compatible with the body part.

* * * * *